June 18, 1935.   S. S. FURRER   2,005,225
DISK HARROW WITH RIGHT AND LEFT TURNING MECHANISM
Filed Aug. 7, 1934   7 Sheets-Sheet 7
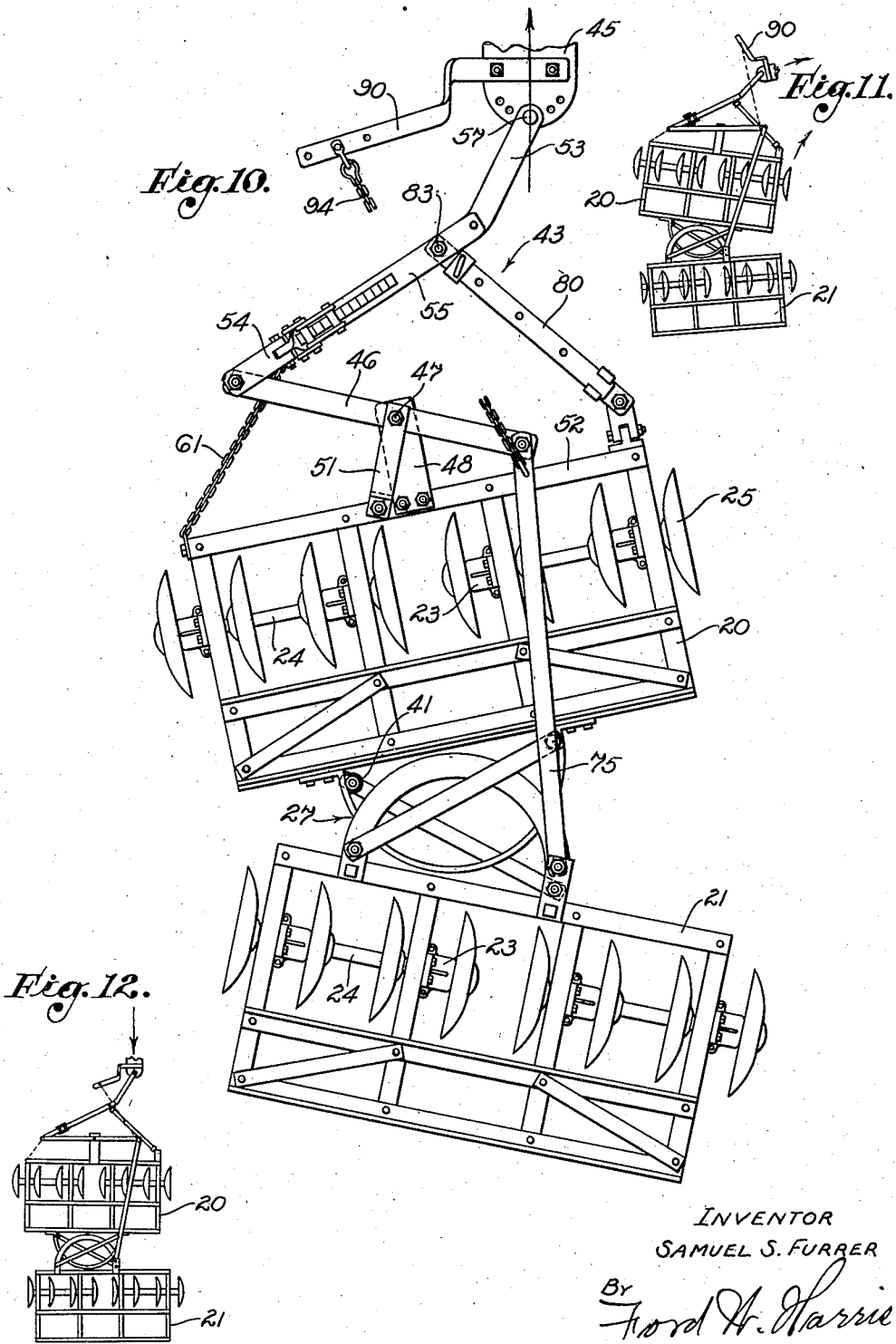
INVENTOR
SAMUEL S. FURRER
By Ford H. Harris
ATTORNEY.

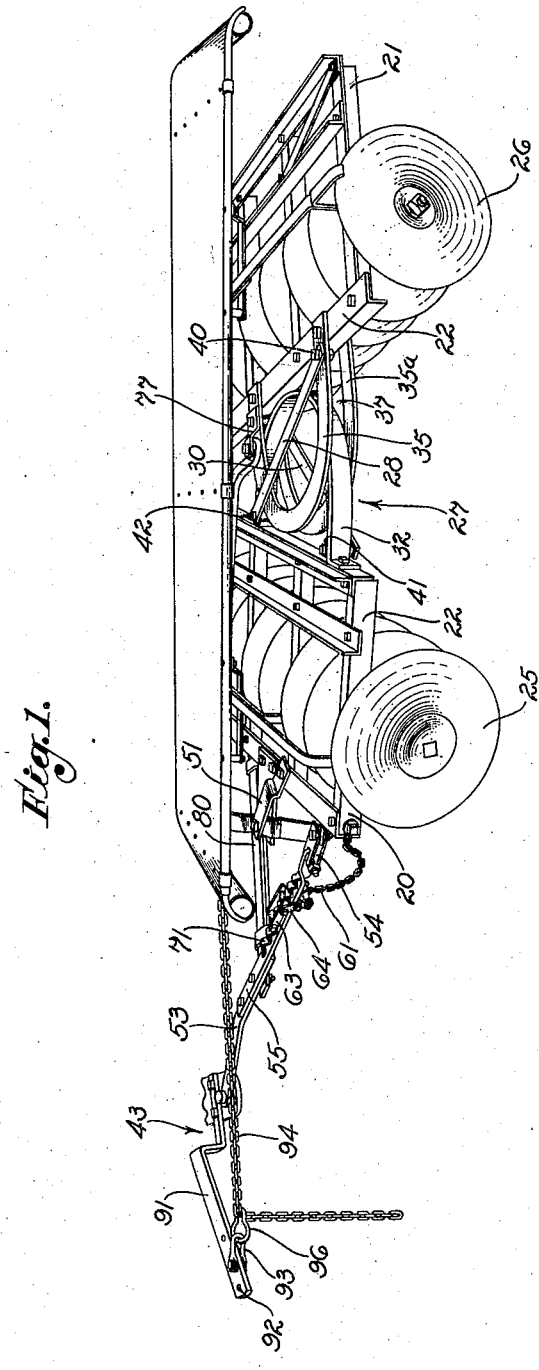

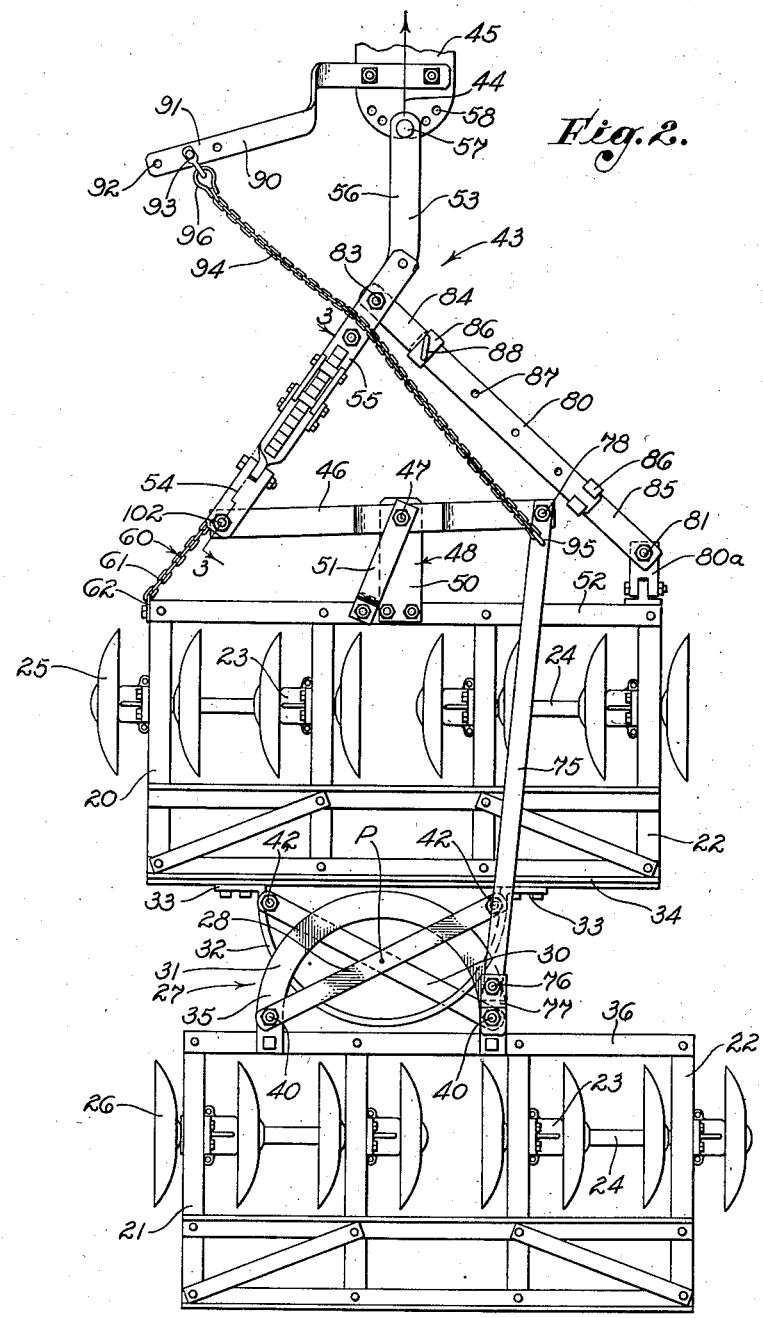

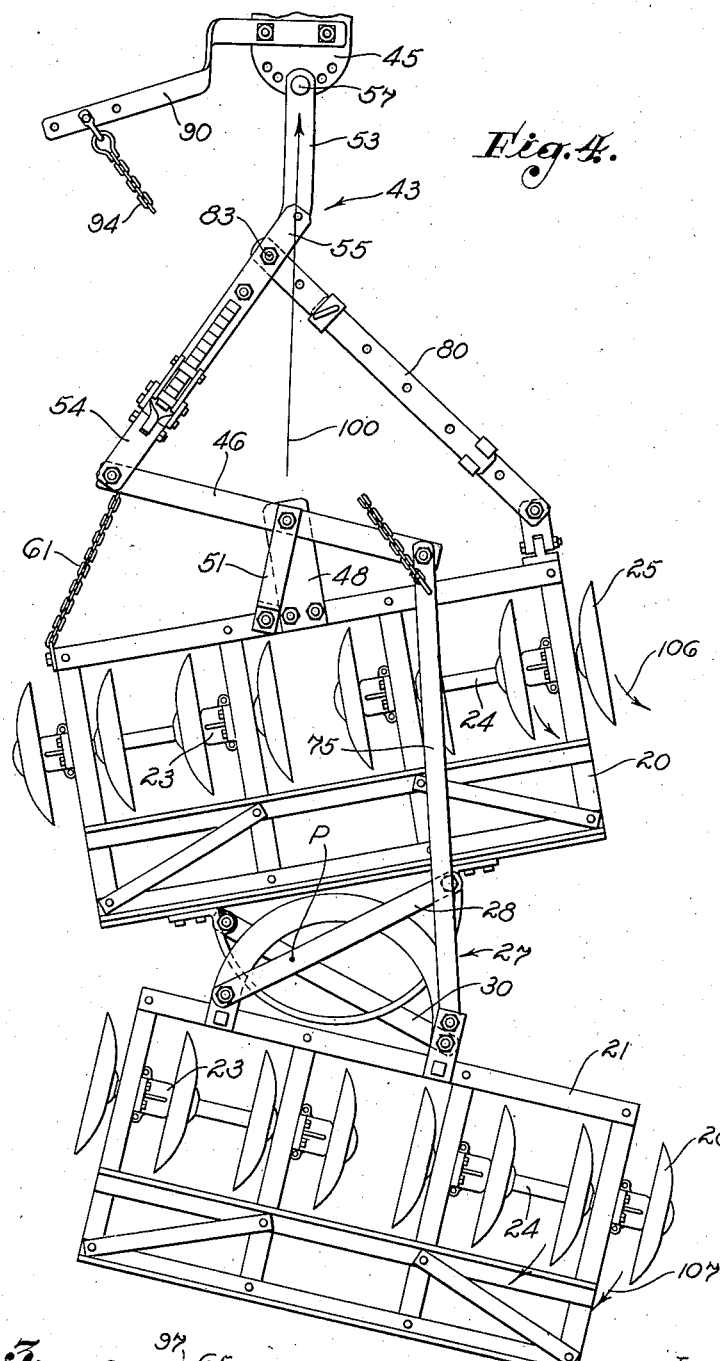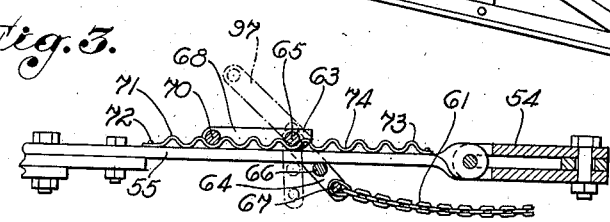

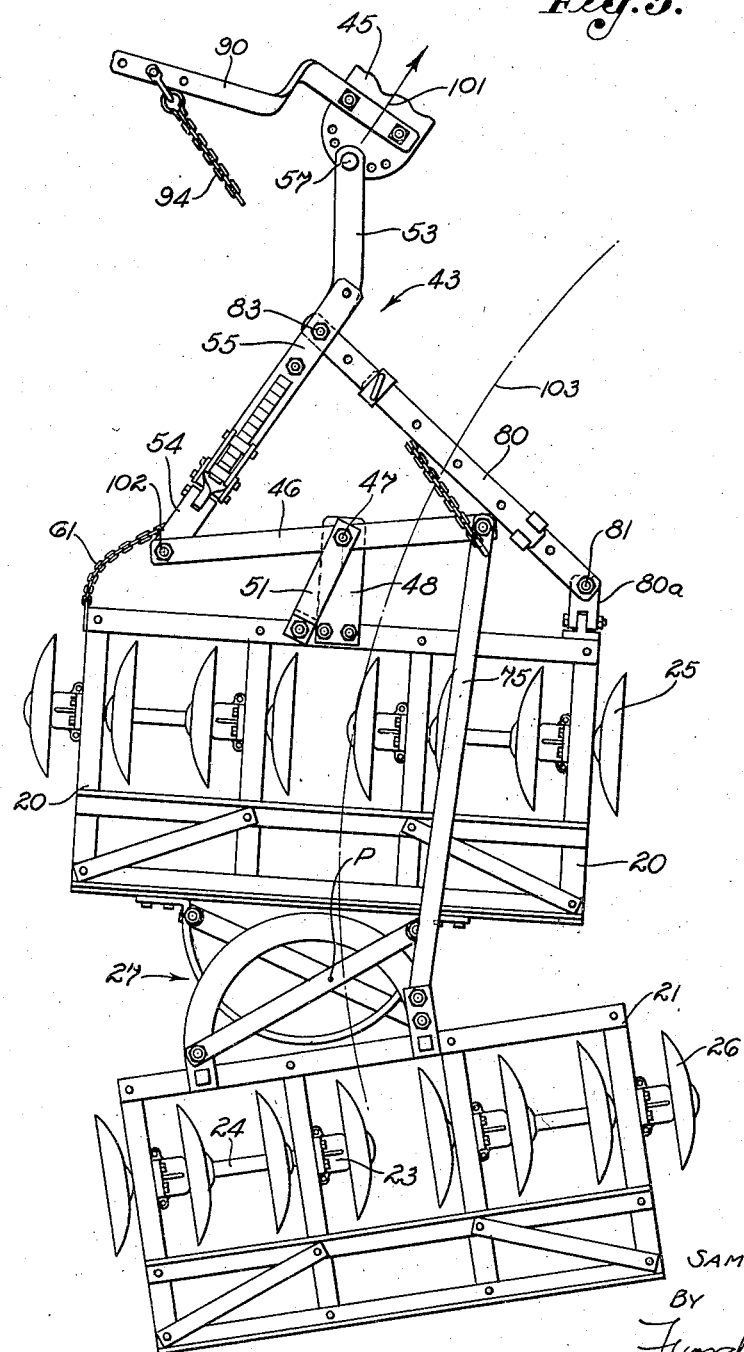

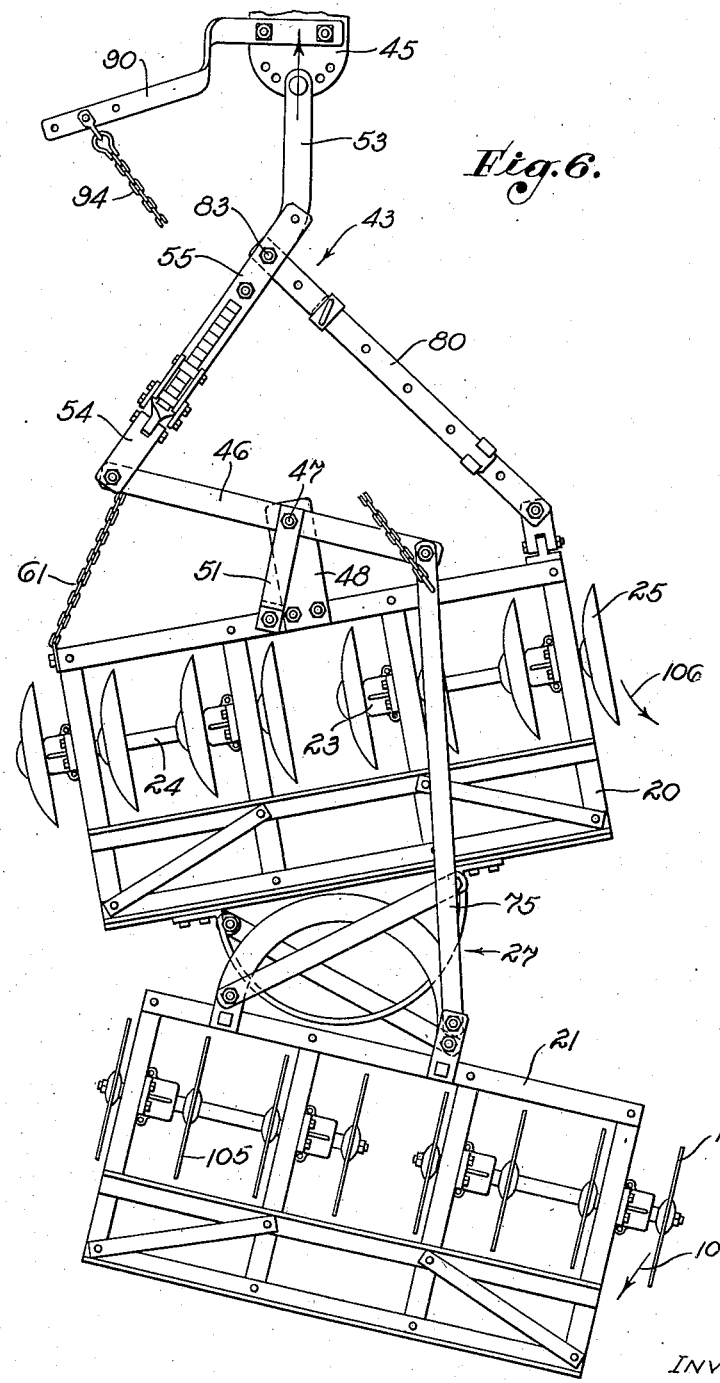

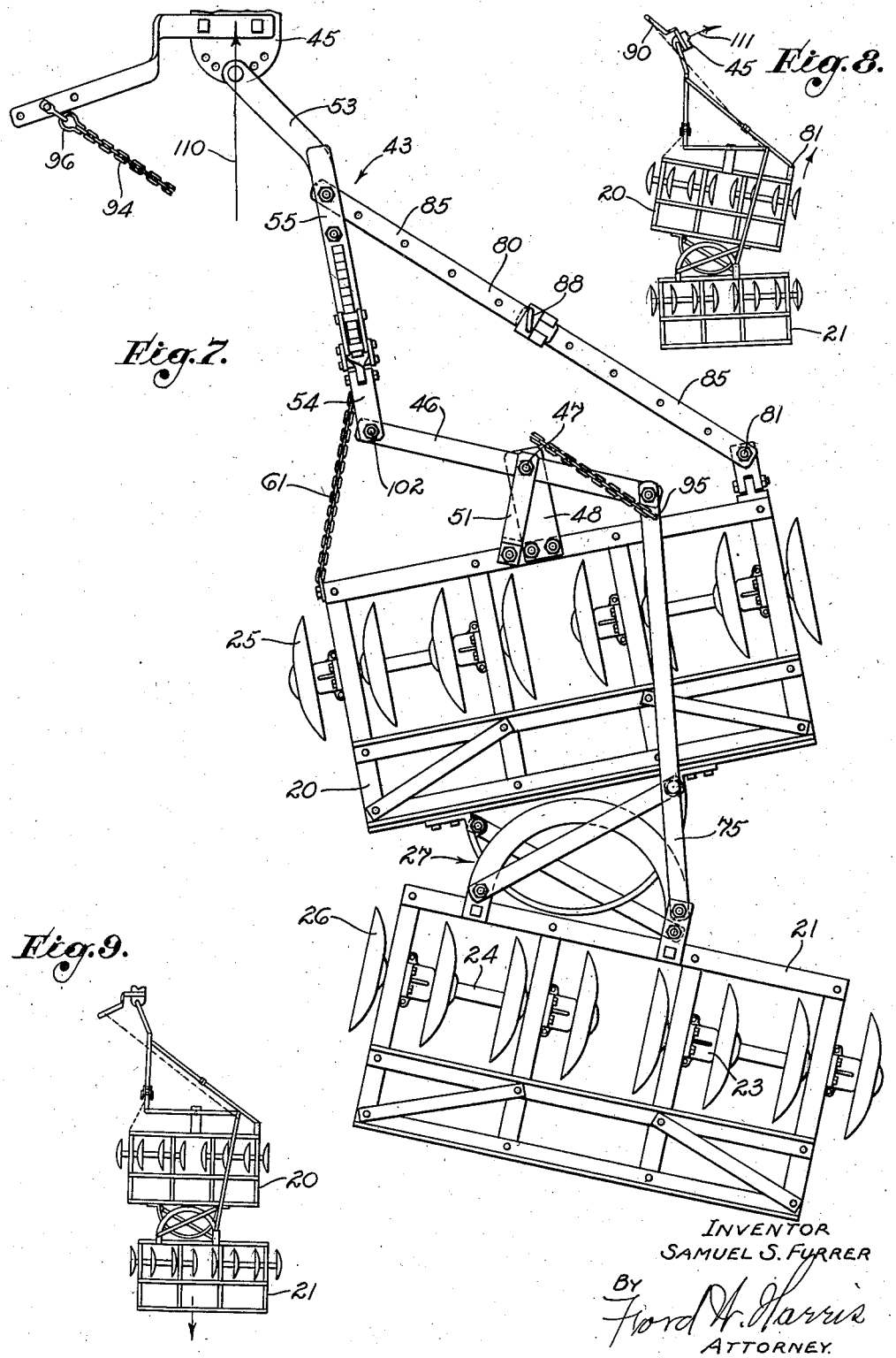

Patented June 18, 1935

2,005,225

UNITED STATES PATENT OFFICE 2,005,225

DISK HARROW WITH RIGHT AND LEFT TURNING MECHANISM

Samuel S. Furrer, Oxnard, Calif., assignor to Brenneis Manufacturing Company Inc., Oxnard, Calif., a corporation of California Application August 7, 1934, Serial No. 738,773

16 Claims. (Cl. 55—83)

My invention relates to agricultural implements, and relates in particular to disk harrows of the type in which the harrow gangs are employed in positions one behind the other. When in operation the gangs are swung into angled position so that the disks of the forward, or leading section, turn the soil in one direction and the disks of the following section turn the soil in the opposite direction. My present invention is an improvement on the devices disclosed in Patent No. 1,831,042 to James S. Stewart, entitled Turning device for offset harrows, issued November 10, 1931, and Patent No. 1,781,171 to Samuel S. Furrer, entitled Disk harrow, issued November 11, 1930.

The ideal harrow of this general type should have the following characteristics: first, it should be capable of forward, rolling movement without disking action, as in pulling the harrow along a road or ground between the barns and the fields where it is to be used; second, it should be adjustable so as to be used in angled or expanded position directly behind the puller, such as a tractor, and in offset position either to the right or to the left of the line of travel of the puller; third, it should be capable of being backed up when in either of the foregoing positions of operation without running out of the furrows which it has previously made; fourth, it should be positively maintained in angled or open position regardless of the slope or character of the soil in which it is being used; and, fifth, it should be capable of being turned either to the right or to the left from either and each of the positions of operation above set forth without the necessity of operating latches or releases to cause or permit the desired turning movement. To my knowledge, most of the disk harrows now in use have one or more of the desirable advantages, but very few have all of them. For example, a harrow which is equipped so that it will be positively maintained in open position during its operation will resist turning in a direction opposite hand to the natural turning tendency of the harrow when its sections are in angled or disking position, or it may require backing up or the manual operation of parts of its mechanism to permit or cause its proper turning action at the desired time.

It is an object of my invention to provide a disk harrow which may be turned to the right or to the left from either centralized, left-hand offset, or right-hand offset position of operation without the necessity of backing up, pulling a latch rope, or the manual operation of any other mechanism.

It is a further object of the invention to provide a disk harrow which will not close up during its operation of disking downhill or in hard soil. A feature of the device is that it is always positively held in open position, but will automatically turn either to the right or left. My present harrow will positively reopen after a right-hand turn regardless of the soil condition, and the harrow may be closed or backed up in a right-hand turn.

A further object of the invention is to provide a harrow which will disk straight back in the furrows previously formed in either centralized or right and left-hand offset positions.

A further object of the invention is to provide a disk harrow having an improved pivot means for connecting the leading and following sections, the chief characteristic of such pivot means being that it provides a laterally movable pivot point which shifts as the sections are moved to and from angled relation so as to assist the forces which are operating in the structure to produce those various positions required in the angling, closing, backing, and turning of the harrow. This feature of the invention contributes to its automatic action.

A further object of the invention is to provide for a harrow of this character a novel and simplified form of ribbon ratchet type adjustment means.

A further object of the invention is to provide a harrow which may be employed to shift the surface soil laterally so as to overcome the ridging effect produced between rows of trees by the continued action of ordinary type harrows.

The present invention is considered a marked improvement in disk harrows in that in addition to positive opening and closing of the leading and following sections, turning to the right or to the left, and operating in either right-hand or left-hand offset position, it accomplishes these effects automatically.

Further objects and advantages will be brought out in the following part of the specification.

Referring to the drawings which are for illustrative purposes only:

Fig. 1 is a perspective view of a preferred embodiment of my invention with the leading and following sections thereof in position for making a right-hand turn.

Fig. 2 is a plan view of the harrow, with the guard plate removed, and with the gangs thereof disposed in transporting position in which the disks are aligned with the direction of travel so that they roll straight ahead without cultivating or disking action.

Fig. 3 is an enlarged fragmentary section taken as indicated by the line 3—3 of Fig. 2.

Fig. 4 is a plan view of the harrow with the parts thereof disposed for disking action in a position centralized or straight behind the tractor.

Fig. 5 is a plan view similar to Fig. 4 but showing the manner in which a right-hand turn is accomplished.

Fig. 6 is a plan view showing a form of the invention adapted for shifting the soil rightwardly for the purpose of flattening ridges of soil which are formed between the rows of trees.

Fig. 7 is a plan view of the harrow in right-hand offset disking position.

Fig. 8 is a diagrammatic view to reduced scale showing the position which the respective parts of the harrow assume when turning to the right from right-hand offset position.

Fig. 9 is a diagrammatic view showing the respective parts of the harrow disposed in right-hand offset non-disking position.

Fig. 10 is a plan view showing the harrow in left-hand offset disking position.

Fig. 11 is a diagrammatic plan view to reduced scale showing the positions of the harrow parts when a rightward turn is made from left-hand offset position.

Fig. 12 is a diagrammatic plan view showing the harrow parts in left-hand offset non-discing position.

The harrow disclosed in Figs. 1 and 2 comprises a leading gang or section 20 and a following section 21, each of which comprises a fabricated metal frame 22 having downwardly extending bearing members 23 which carry shafts 24 in laterally extending position. The shafts 24 of the front harrow section 20 support disks 25 which are dished to the right, and the shafts 24 of the following section 21 carry disks 26 which are dished to the left so that when the harrow is pulled forward in operation, the front disks 25 will turn the soil to the right and the rear disks will turn the soil to the left. To produce a desired alignment of the front and rear disks 25 and 26, the following section 21 is offset to the right, as clearly shown in Fig. 2.

The leading and following sections 20 and 21 are connected together by pivotal connecting means 27 which is so constructed as to provide a pivot point which automatically moves in lateral direction as the angle between the leading and following sections is changed. In my invention a pivot means of this character is produced by the use of cross bars 28 and 30, each of which has one end connected to the leading section 20 and the other end connected to the following section 21. In conjunction with the cross bars 28 and 30, I provide means 31 for holding the leading and following sections substantially in the same horizontal plane but which means permits a relative swinging movement between the leading and following sections in such plane. This means 31 comprises a bar 32 which is bent to substantially semi-circular form and has end plates 33 formed thereon which are bolted to the rear frame member 34 of the leading section 20 so that the bar 32 will project rearwardly from the leading section 20 in a substantially horizontal plane. In sliding engagement with the bar 32 I provide upper and lower bars 35 and 35a which are bolted in vertically spaced relation to the front frame member 36 of the following section 21. The bars 35 and 35a are also substantially semi-circular in form and lie respectively above and below the bar 32 and provide a horizontal space 37 in which the bar 32 is slidably received. The cross bars or links 28 and 30 are respectively above and below the bars 35 and 35a, as clearly shown in Fig. 1. The rearward end of each cross bar 28 and 30 is perforated, and bolts 40 are employed to secure the bars 28 and 30 respectively to opposite side portions of the bars 35 and 35a. Lugs 41 are secured to the forward side portions of the bar 32 adjacent the plates or flanges 33 and bolts 42 provide pivot means engaging the forward ends of the cross bars 28 and 30. When the leading and following sections 20 and 21 are in closed relation, as shown in Fig. 2, that is, with the bars 34 and 36 substantially parallel and with the shafts 24 of the two sections also substantially parallel so that the disks will be aligned with the forward direction of travel of the harrow indicated by the arrow 44, the cross bars 28 and 30 establish a pivot point P which is centralized with relation to the sides of the bars 32 and 35, but which is offset a short distance to the left of a center line through the harrow structure by reason of the fact that the bars 32 and 35 are mounted in leftwardly offset relation on the leading and following sections 20 and 21. In Fig. 4 the sections 20 and 21 are shown in open or angled relation, that is, with the rightward, or secondary, ends thereof spread apart. At this time the rightward ends of the bars 28 and 30 are spread apart and the pivot point P has been moved leftwardly as the result of the changed position of the bars 28 and 30.

Likewise, when the harrow is in rightward turning position, as shown in Fig. 5, the leftward ends of the bars 28 and 30 will be spread apart and the pivot point P will be moved to the right of the centralized position which is shown in Fig. 2.

My invention incorporates pulling means 43 by which the harrow may be secured to a pulling device which ordinarily consists of a tractor and which is represented in the drawings by a draft plate 45 which is rigidly secured to the rearward portion of the tractor. The draft or pulling means 43 includes a rotary element 46 comprising a laterally extending fulcrum bar having an intermediate portion thereof pivoted on a bolt 47 which is held in a vertical position at the forward end of a bracket 48 which consists of plates 50 and 51 which extend forwardly from an intermediate portion of the front frame member 52 of the leading section 20. In considering the fulcrum bar 46, the leftward end thereof may be termed the primary end, and to such primary end of the member 46 the rearward end of a puller bar 53 is connected by means of a swivel 54. The puller bar 53 consists of a rearward bar portion 55 which extends diagonally rightwardly and forwardly from the leftward end of the member 46, and a forward bar portion 56 which extends substantially straight ahead from the forward end of the rearward bar portion 55 so as to connect to a draft pin 57 which passes through one of the openings 58 in the draft plate 45 of the pulling device or tractor. When the puller bar 53 is pulled forwardly it tends to rotate the fulcrum bar 46 in clockwise direction. Such rotation, which for comparison may be considered "positive" is controlled, that is, either prevented or limited by an adjustable link means 60 which consists of a chain 61 having its rearward end secured to a plate 62 mounted at the leftward or primary side of the leading section 20, and an attachment head 63 adapted to engage the rearward bar portion 55 of the puller bar 53 at different positions therealong, this head 63 consisting of a pair of side plates 64 extending above and below the sides of the bar portion 55 and being connected at their upper ends by a cross pin 65 disposed above the bar portion 55, and being connected at their intermediate portions by a cross pin 66 which is disposed below the bar 55. A bolt 67 at the lower ends of the side plates 64 connects the head 63 to the forward end of the chain 61. Extending forwardly and angularly from the upper ends of the side plates 64 are parallel plates 68 which support a pin 70 at their forward ends. On the upper face of the bar portion 55 a metal ribbon 71 is secured by means of screws or rivets 72. This ribbon is bent so as to form a sinuous configuration whereby to provide spaced projections 73 and grooves or pockets 74 in which the pins 65 and 70 may rest, as shown in Fig. 3. When the harrow is disposed in closed or transporting relation, the head 63 is connected to the forward portion of the member 55, as shown in Fig. 3, so that the chain 61 is substantially taut when the fulcrum bar 46 is in the position shown in Fig. 2. Therefore, at this time a pull exerted on the puller bar 53 cannot swing the fulcrum bar 46 in clockwise direction.

The rightward or secondary end of the fulcrum bar 46 is connected to the following section 21 by means of an angling bar 75 which has its rearward end pivoted on a bolt 76 carried by a bracket 77 mounted at the rightward side of the bar 35, and has its forward end pivotally connected to the fulcrum bar 46 by means of a bolt 78. Since the pivot point provided by the bolt 76 is rightwardly offset by the pivot point P, the position of the angling bar 75 controls the position of the following section 21 relative to the leading section 20.

By means of a swivel 80a and a bolt 81 an adjustable aligning link 80 is connected to the rightward or secondary side of the leading section 20. This aligning link extends diagonally forwardly and leftwardly to a bolt 83 disposed near the forward end of the rearward bar portion 55 of the puller bar 53. The aligning link 80 is of expansile contractile character and consists of overlapping bars 84 and 85, each of such bars having a metal loop 86 on the end thereof through which the other of such bars is slidable, and there being openings 87 in the bars 84 and 85 through which an adjusting pin 88 may be passed to hold the aligning link 80 in a desired position of extension. When the aligning link is extended, as shown in Fig. 2, the puller bar will be held in such position relative to the leading section 20 that the forward end portion 56 thereof will extend substantially straight ahead in a centralized position, and the harrow will be centrally aligned with and behind the pulling device. Lengthening and shortening of the aligning link are employed to respectively produce operating alignments of the harrow with the pulling device ordinarily termed "right-hand offset" and "left-hand offset", as will be hereinafter set forth in detail.

On the pulling device, and preferably secured to the draft plate 45, is a turning lever 90 which projects leftwardly from the pivot point represented by the pin 57, this turning lever having the leftward portion 91 thereof angled slightly rearwardly and having spaced holes 92 therein to which a clevis 93 may be selectively secured so as to serve as a connecting means for a turning link 94 which preferably consists of a chain and is therefore collapsible. The chain 94 has its rearward end connected to the rightward end of the fulcrum bar 46 and to the forward end of the angling bar 75 by means of an eye-bolt 95 which is mounted near the forward end of the angling bar 75. Looped into the clevis 93 is an adjusting link or loop 96 adapted to engage the chain 94 at different portions thereof in the manner shown in Fig. 1 so as to vary the effective length of the chain or turning link 94.

When the harrow has been rolled or transported in the closed position, as shown in Fig. 2, to a desired point of operation, the adjusting head of the adjusting link means 60 is moved into a position toward the rearward end of the ribbon 71, depending of course upon the degree of angle which is desired between the leading and following sections 20 and 21 of the harrow. This adjustment of the head 63 is accomplished by raising the forward portion 68 thereof, as indicated by dotted lines 97 in Fig. 3, so that the side plates 64 will be swung downwardly to carry the pin 66 into a position vertically below the pin 65 whereupon the upper pin 65 may be lifted over the ridges or humps 73 of the ribbon. Pull or tension in the chain 61 swings the lower end of the head 63 in rearward direction so as to pull the pin 65 down tightly into one of the pockets 74 of the ribbon 71. After this setting of the adjusting link means 60, a forward movement of the tractor will exert a pull against the puller bar 53 with the result that the fulcrum member 46 will be rotated positively until the chain 61 becomes taut. This same pulling force, exerted through the puller bar 53, is transmitted through the fulcrum bar, as shown in Fig. 4, so as to produce a positive rearward force acting against the angling bar 75 to swing the rightward side of the following section 21 rearwardly into angled relation to the leading section 20. At the same time the puller bar 53 will have moved the aligning link 80 forwardly so as to swing the rightward side of the leading section 20 into a forwardly angled position wherein the disc 25 of the leading section 20 will be disposed in angular relation to the line of travel indicated by the line 100 of Fig. 4. It will be noted that at this time the spreading of the rightward ends of the cross bars 28 and 30 will result in a leftward movement of the pivot point P, with the result that the greater portion of the following section 21 lies to the right of the pivot point P so that the reaction of the soil against the disk 26 will definitely tend to assist the force operating through the angling bar 75 to maintain the following section 21 in angled relation.

The harrow sections 20 and 21 when in angled or disking position, as shown in Fig. 4, will readily turn to the left, but a rightward turn is definitely resisted by the sections in this position. However, the harrow will readily turn to the right for the reason that automatic operating means are provided for moving the harrow sections 20 and 21 from the rightwardly angled position shown in Fig. 4 to the leftwardly angled position in which they are shown in Fig. 5. This action is accomplished through the use of the turning lever 90 and the turning link 94. When the pulling device is turned rightwardly from the straight ahead direction of travel shown by the line 100 of Fig. 4 toward a direction such as indicated by the arrow 101 of Fig. 5, the turning lever 90 is swung in clockwise direction so as to pull forwardly on the turning link 94, the result being that the fulcrum bar 46 is rotated in anti-clockwise or negative direction from the position shown in Fig. 4 to the position in which it is shown in Fig. 5. The collapsibility of the chain 61 permits the leftward end of the fulcrum bar 46 to swing toward the harrow section 20 and the forward swinging movement of the bar 46 around the pivot provided by the bolt 102 at its leftward end causes the leading section to swing forwardly on the bolt 81 associated with the swivel 80, and at the same time the forward movement of the angling bar 75 pulls the rightward portion of the following section 21 forwardly into a position wherein the leftwardside of the sections 20 and 21 are spread apart and the discs 25 and 26 are disposed so as to follow an arc 103 curving to the right of the harrow and therefore permitting the harrow to readily turn to the right. The entire readjustment of parts for a right-hand turn is automatic. In the foregoing paragraph we have described the operation of turning to the right from the operating or discing position shown in Fig. 4. The mechanism operates in a similar manner from the transporting position, as shown in Fig. 2. For example, when a right-hand turn is made, the draft plate 45 of Fig. 2 will be rotated to the right, swinging the turning lever 90 so as to exert tension in the turning link 94, the result then being that the fulcrum bar 46 will rotate forwardly or in anti-clockwise direction around the bolt 102 so as to swing the leading section 20 slightly forward around the bolt 81, and at the same time the forward movement of the angling bar 75 will swing the rightward portion of the following section 21 forwardly. The leading and following sections 20 and 21 will be then in the respective position shown in Fig. 5 and a right-hand turn may be readily accomplished.

Relative to the backing of the device, let it be assumed that it is desired to back up from the position of the harrow shown in Fig. 4. The rearward force of the tractor is transmitted to the forward bar portion 56 of the puller bar 53 to the leftward end of the fulcrum bar 46, and through the aligning link 80 to the rightward side of the leading section 20. Accordingly, the fulcrum bar 46 will be swung in anti-clockwise direction so that a pull will be exerted through the angling bar 75 to move the following section 21 from the position which is shown in Fig. 4 toward the position which is shown in Fig. 2 while at the same time the rightward portion of the leading section 20 is swung rearwardly by the force exerted through the aligning link 80 from its position in Fig. 4 toward its position in Fig. 2. Accordingly, the sections 20 and 21 are moved by the backing force into the positions in Fig. 2 wherein they may move straight to the rear in alignment with the furrows which have been previously formed by the discs. A part of my present invention relates to a harrow construction in which a definite rightward movement of the soil is accomplished. I have, accordingly, in Figs. 1 to 5, shown a harrow equipped with dished discs on both the leading and following sections, and in Fig. 6 I have shown my improvement wherein flat discs 105 are employed on the following section 21. When the harrow shown in Fig. 4 is operated forwardly, the action of the front discs 25, since they are dished to the right, is to move the soil in a rightward direction indicated by arrows 106. The discs 26 being dished in opposite direction each move the soil leftwardly, as indicated by arrows 107. It is found, however, in the use of this type of harrow that the leftward movement of the soil indicated by arrows 107 is slightly greater than the rightward movement of the soil so that over a period of years of operation in orchards the soil is moved from under the trees toward the centers of the spaces or paths between the trees, forming mounds or low ridges of soil between the rows of trees. My present invention offers a solution to this problem which is now a matter of material concern to the orchardists. The discs 25 shown in Fig. 6, due to the manner in which they are dished, have a definite tendency to move the soil rightwardly, as indicated by arrows 106, but the discs 105 of the following section 21 being flat move the soil leftwardly as indicated by arrows 108 but to a much smaller extent. Accordingly, each time the harrow shown in Fig. 6 is moved forwardly in discing position, whether in direct alignment behind the pulling vehicle, as shown, or in offset position, a small rightward movement of the soil will be accomplished so that in a reasonable time the soil forming the ridge between the rows of trees will be moved back under the trees to restore the original level of the ground.

The harrow is readily adjusted to offset the position of operation by changing the length of the aligning link 80. For example, if it is desired to offset the harrow to the right of the pulling device so that the harrow will pass under the branches of trees as the tractor is propelled along a path in which the branches will be cleared, the aligning link is extended as shown in Fig. 7, which adjustment of the aligning link is accomplished by withdrawing the pin 88 from its locking position and then moving the bars 84 and 85 relatively apart after which the pin 88 is replaced. This extension of the aligning link 80 causes the pulling bar 53 to be swung leftwardly around the bolt 102 from diagonal position such as shown in Fig. 4 toward a forwardly extended position, as shown in Fig. 8. Adjustment of the aligning link 80 must be accompanied by a readjustment of the turning link or chain 94 to compensate for the increased space between the members 95 and 96. After such simple adjustment of the parts 80 and 94, the harrow will operate in a position offset to the right of the direct line of travel of the pulling device indicated by the arrow 110 of Fig. 7. The harrow will automatically turn from rightward offset position since the cooperation of the parts previously described is not changed by the changing of the alignment of the harrow. When the pulling device is turned to the right so as to swing the draft plate 45 from a straight ahead position such as shown in Fig. 7 to the angular position indicated by the arrow 111 of Fig. 8, the turning link 90 will be swung rightwardly so as to pull forwardly on the chain 94, thereby swinging the rotary element or fulcrum bar 46 in anti-clockwise direction and consequently causing the leftward side of the leading section to be pulled forwardly around the pivot point formed by the bolt 81 at the rearward end of the aligning link 80, and to cause the forward movement of the rightward side of the following section 21, whereupon the right-hand turn will be made with the leading and following sections 20 and 21 in the respective positions in which they are shown in Fig. 8.

Fig. 9 shows the harrow in an offset closed position which is produced in essentially the same manner as described relative to Fig. 2 when the pulling device or tractor is backed up. Likewise, the harrow in right-hand offset position may be caused to travel straight ahead without disking action by adjusting the head 63 of the link means 60 forwardly on the puller bar 53 so as to prevent angling movement of the harrow sections. Likewise, either a right-hand or a left-hand turn may be made from right-hand offset closed position of the harrow indicated diagrammatically in Fig. 9. When it is desired to employ the harrow in left-hand offset position, the aligning link 80 is shortened, as shown in Fig. 10, so as to swing the puller bar 53 to the left, and the turning link 94 is likewise adjusted to produce a decreased effective length thereof. In Fig. 10 the harrow is shown in left-hand offset disking or angled position wherein the rightward sides of the harrow sections 20 and 21 are spread apart. In Fig. 11 the harrow is shown with the parts thereof automatically adjusted for a right-hand turn from left-hand offset position, this readjustment of the leading and following sections 20 and 21 being accomplished as previously described by the clockwise partial rotation of the turning lever 90 in response to a rightward turning of the pulling device. In Fig. 12 the harrow is shown in left-hand closed position such as the sections 20 and 21 thereof assume when the harrow is being backed or when it is being transported directly ahead without disking action. The harrow sections 20 and 21 will automatically and freely turn either to the right or left from the closed position indicated diagrammatically in Fig. 12.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A harrow of the character described, including: a leading section and a following section pivotally connected so as to be swung from closed to angled relation; pulling means connected to said leading section for attaching the harrow to a pulling device; angling means connecting said pulling means to said following section and operating in response to a pulling force in said pulling means to positively swing said following section toward angled position; collapsible means for limiting the angling movement of said following section to angled relation relative to said leading section, said collapsible means comprising a chain which folds when said sections move toward closed relation and extends when said sections move toward angled relation; and means connecting said following section to said pulling device and moving said following section toward closed relation to said leading section when said pulling device turns rightward relative to said harrow.

2. A harrow of the character described, including: a leading section and a following section; means for connecting said sections pivotally together so that they will swing from closed to angled relation, said means comprising a pair of bars in crossing relation and lying in a substantially horizontal plane, one end of each bar being connected to said leading section and the other end of each bar being connected to the following section, and said bars producing a pivot point which moves laterally as said sections swing; pulling means connected to said leading section for attaching the harrow to a pulling device; means for controlling the relative opening and closing movement of said sections; and primary and secondary members secured to said leading and following sections so as to engage in a horizontal plane so as to maintain said sections in the same plane but to permit rotation thereof on an axis substantially perpendicular to said plane.

3. A harrow of the character described, including: a leading section; a following section; pivot means connecting said sections together so that they may swing from closed to angled relation; pulling means for connecting said leading section to a pulley device, said pulling means comprising a rotary element having an intermediate portion thereof connected to said leading section, and means for connecting one side of said rotary element to said pulling device whereby a pulling force transmitted from said pulling device to said pulling means will tend to rotate said rotary element; angling means connecting said rotary element to said following section so that rotation of said rotary element will cause said following section to swing toward open position relative to said leading section; and a collapsible turning link connecting said rotary element to said pulling device so that a turning movement of said pulling device in one direction will rotate said rotary element in reverse direction to transmit through said angling means a force to swing said following section toward closed relation to said leading section.

4. A harrow of the character described, including: a leading section; a following section; pivot means connecting said sections together so that they may swing from closed to angled relation; pulling means for connecting said leading section to a pulling device, said pulling means comprising a rotary element having an intermediate portion thereof connected to said leading section, and means for connecting one side of said rotary element to a pivot carried by said pulling device whereby a pulling force transmitted from said pulling device to said pulling means will tend to rotate said rotary element; angling means connecting the opposite side of said rotary element to said following section so that rotation of said rotary element will cause said following section to swing toward open position relative to said leading section; and means comprising a linkage connecting said pulling device to said following section at a point eccentric to said pivot so as to move said following section toward closed relation to said leading section when said pulling device is turned relative to said harrow.

5. A harrow of the character described, including: a leading section; a following section; pivot means connecting said sections together so that they may swing from closed to angled relation; pulling means for connecting said leading section to a pulling device, said pulling means comprising a rotary element having an intermediate portion thereof connected to said leading section, a puller bar extending forwardly from one side of said rotary element to said pulling device whereby a pulling force transmitted from said pulling device to said pulling means will tend to rotate said rotary element, and an aligning link connecting a forward portion of said puller bar to one side of said leading section; and angling means connecting the opposite side of said rotary element to said following section so that rotation of said rotary element will cause said following section to swing toward open position relative to said leading section.

6. A harrow of the character described, including: a leading section; a following section; pivot means connecting said sections together so that they may swing from closed to angled relation; pulling means for connecting said leading section to a pulling device, said pulling means comprising a rotary element having an intermediate portion thereof connected to said leading section, a puller bar extending forwardly from one side of said rotary element to said pulling device whereby a pulling force transmitted from said pulling device to said pulling means will tend to rotate said rotary element, and an aligning link connecting a forward portion of said puller bar to one side of said leading section; angling means connecting the opposite side of said rotary element to said following section so that rotary movement of said rotary element will swing said following section relative to said leading section; and means connecting the opposite side of said rotary element to said pulling device so that a turning movement of said pulling device in one direction will rotate said rotary element in reverse direction to transmit through said angling means a force to swing said following section toward closed relation to said leading section.

7. A harrow of the character described, including: a leading section; a following section; pivot means connecting said sections together so that they may swing from closed to angled relation; pulling means for connecting said leading section to a pulling device, said pulling means comprising a rotary element having an intermediate portion thereof connected to said leading section, a puller bar connecting one side of said rotary element to said pulling device whereby a pulling force transmitted from said pulling device to said pulling means will tend to rotate said rotary element, and an aligning link connecting a forward portion of said puller bar to one side of said leading section; angling means connecting said rotary element to said following section so that rotation of said rotary element will cause said following section to swing toward open position relative to said leading section; and a collapsible turning link connecting said rotary element to said pulling device so that a turning movement of said pulling device in one direction will rotate said rotary element in reverse direction to transmit through said angling means a force to swing said following section toward closed relation to said leading section.

8. A harrow of the character described, including: a leading section; a following section; pivot means connecting said sections together so that they may swing from closed to angled relation, said pivot means comprising cooperating parts forming a pivot point which moves laterally in one direction to an eccentric position as said sections are moved toward angled relation and moves in the opposite direction when said sections are moved toward closed relation; pulling means for connecting said leading section to a pulling device, said pulling means comprising a rotary element having an intermediate portion thereof connected to said leading section, a puller bar connecting one side of said rotary element to said pulling device whereby a pulling force transmitted from said pulling device to said pulling means will tend to rotate said rotary element, and an aligning link connecting a forward portion of said puller bar to one side of said leading section; an angling means connecting said rotary element to said following section so that rotation of said rotary element will cause said following section to swing toward open position relative to said leading section; and a collapsible turning link connecting said rotary element to said pulling device so that a turning movement of said pulling device in one direction will rotate said rotary element in reverse direction to transmit through said angling means a force to swing said following section toward closed relation to said leading section.

9. A harrow of the character described, including: a leading section; a following section; pivot means connecting said sections together so that they may swing from closed to angled relation, said pivot means comprising a pair of bars in crossing relation, each having one end thereof connected to said leading section and the other end thereof connected to the following section and forming a pivot point which moves laterally in one direction to an eccentric position as said sections move toward angled relation and moves in the opposite direction when said sections are moved toward closed relation; pulling means for connecting said leading section to a pulling device, said pulling means comprising a rotary element having an intermediate portion thereof connected to said leading section, a puller bar connecting one side of said rotary element to said pulling device whereby a pulling force transmitted from said pulling device to said pulling means will tend to rotate said rotary element, and an aligning link connecting a forward portion of said puller bar to one side of said leading section; angling means connecting said rotary element to said following section so that rotation of said rotary element will cause said following section to swing toward open position relative to said leading section; and a collapsible turning link connecting said rotary element to said pulling device so that a turning movement of said pulling device in one direction will rotate said rotary element in reverse direction to transmit through said angling means a force to swing said following section toward closed relation to said leading section.

10. A harrow of the character described, including: a leading section; a following section; means connecting said sections together so that they may swing from closed to angled relation; a bracket extending forwardly from an intermediate point of said leading section; a rotary element comprising a laterally extending fulcrum bar having an intermediate portion thereof connected to said bracket; a puller bar connected to the primary end of said laterally extending fulcrum bar so that a pull exerted through said bar from a pulling device will cause rotation of said laterally extending fulcrum bar in positive direction; adjustable link means connecting said primary end of said fulcrum bar to the primary side of said leading section; an adjustable aligning link connecting the forward portion of said puller bar to the secondary side of said leading section; and an angling bar connecting the secondary end of said fulcrum bar with said following section so as to move said following section toward angled relation to said leading section when said puller bar moves the primary end of said fulcrum bar in forward direction.

11. A harrow of the character described, including: a leading section; a following section; means connecting said sections together so that they may swing from closed to angled relation; a bracket extending forwardly from an intermediate point of said leading section; a rotary element comprising a laterally extending fulcrum bar having an intermediate portion thereof connected to said bracket; a puller bar connected to the primary end of said laterally extending fulcrum bar so that a pull exerted through said bar from a pulling device will cause rotation of said laterally extending fulcrum bar in positive direction; collapsible link means connecting said primary end of said fulcrum bar to the primary side of said leading section; an adjustable aligning link connecting the forward portion of said puller bar to the secondary side of said leading section; an angling bar connecting the secondary end of said fulcrum bar with said following section so as to move said following section toward angled relation when said puller bar moves the primary end of said fulcrum bar in forward direction; and link means connecting said following section with said pulling device so that a force to move said following section to closed relation will be transmitted from said pulling device to said following section when said pulling device is turned from a direct line of travel.

12. A harrow of the character described, including: a leading section; a following section; means connecting said sections together so that they may swing from closed to angled relation; a bracket extending forwardly from an intermediate point of said leading section; a rotary element comprising a laterally extending fulcrum bar having an intermediate portion thereof connected to said bracket; a puller bar for pivotally connecting a pulling device to the primary end of said laterally extending fulcrum bar so that a pull exerted through said bar from a pulling device will cause rotation of said laterally extending fulcrum bar in positive direction; adjustable link means connecting said primary end of said fulcrum bar to the primary side of said leading section; an adjustable aligning link connecting the forward portion of said puller bar to the secondary side of said leading section; an angling bar connecting the secondary end of said fulcrum bar with said following section so as to move said following section toward angled relation to said leading section when said puller bar moves the primary end of said fulcrum bar in forward direction; a turning lever adapted to be secured to said pulling device in a position extending laterally from the point of connection of said puller bar to said pulling device; and a turning link connecting said turning lever to the forward end of said angling bar.

13. A harrow of the character described, including: a leading section; a following section; means connecting said sections together so that they may swing from closed to angled relation; a bracket extending forwardly from an intermediate point of said leading section; a rotary element comprising a laterally extending fulcrum bar having an intermediate portion thereof connected to said bracket; a puller bar connected to the primary end of said laterally extending fulcrum bar so that a pull exerted through said bar from a pulling device will cause rotation of said laterally extending fulcrum bar in positive direction; means forming a ratchet rack on said puller bar; a member slidable along said puller bar and being adapted to engage said rack in a plurality of positions of adjustment; a chain connecting the primary side of said leading section with said slidable member for limiting the forward movement of the primary end of said fulcrum bar; an adjustable aligning link connecting the forward portion of said puller bar to the secondary side of said leading section; and an angling bar connecting the secondary end of said fulcrum bar with said following section so as to move said following section toward angled relation to said leading section when said puller bar moves the primary end of said fulcrum bar in forward direction.

14. A harrow of the character described, including: a leading section and a following section pivotally connected so as to be swung from closed to angled relation; pulling means connected to said leading section for attaching the harrow to a pulling device; angling means connecting said pulling means to said following section and operating in response to a pulling force in said pulling means to positively swing said following section toward angled position and to swing said following section back to closed relation to said leading section when said pulling device is backed up; and collapsible means for limiting the angling movement of said following section to angled relation relative to said leading section, said collapsible means comprising a chain which folds when said sections move toward closed relation and extends when said sections move toward angled relation.

15. A harrow of the character described, including: a leading section; a following section; means connecting said sections together so that they may swing from closed to angled relation; a rotary element comprising a laterally extending fulcrum bar having the intermediate portion thereof connected to said leading section; a puller bar extending forwardly from the primary end of said fulcrum bar; a pivot connecting the forward end of said puller bar to a pulling device, the forward pull of which causes said fulcrum bar to rotate in positive direction; an angling bar connected to said fulcrum bar and to said following section so that positive rotation of said fulcrum bar will swing said following section toward angled relation; and a collapsible link connecting the secondary end of said fulcrum bar with said pulling device so that said fulcrum bar will be rotated in negative direction when said pulling device is turned to one side.

16. A harrow of the character described, including: a leading section; a following section; means connecting said sections together so that they may swing from closed to angled relation; a rotary element comprising a laterally extending fulcrum bar having the intermediate portion thereof connected to said leading section; a puller bar extending forwardly from the primary end of said fulcrum bar; a pivot connecting the forward end of said puller bar to a pulling device, the forward pull of which causes said fulcrum bar to rotate in positive direction; an angling bar connected to said fulcrum bar and to said following section so that positive rotation of said fulcrum bar will swing said following section toward angled relation; and a link extending from the secondary end of said fulcrum bar and crossing said puller bar to connect with said pulling device.

SAMUEL S. FURRER.